Dec. 6, 1932. A. E. COX ET AL 1,890,109
STONE SAWING MACHINE
Filed Nov. 19, 1931 6 Sheets-Sheet 5
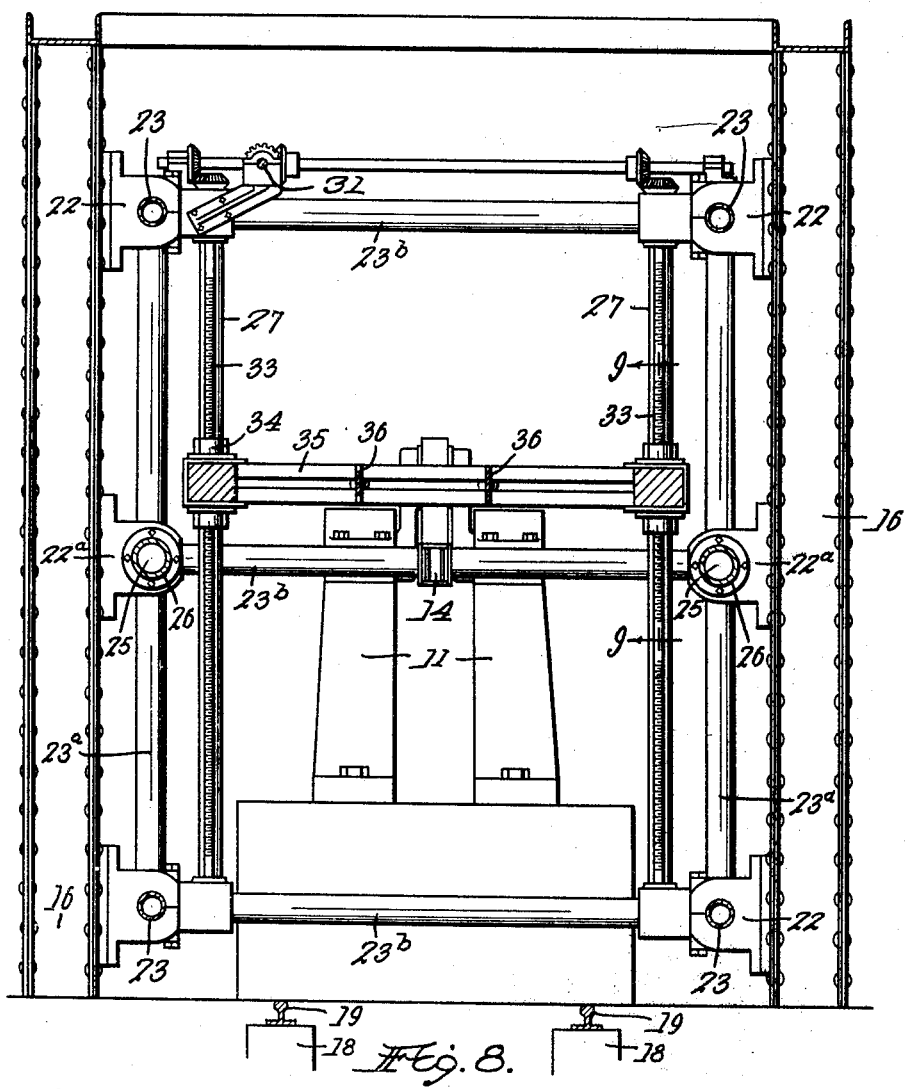
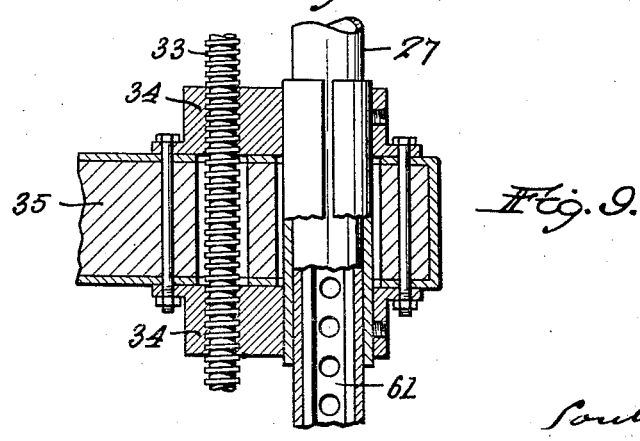
Inventors
Albert E. Cox
John B. Hall
By Attorneys Dec. 6, 1932.  A. E. COX ET AL  1,890,109
STONE SAWING MACHINE
Filed Nov. 19, 1931  6 Sheets-Sheet 6

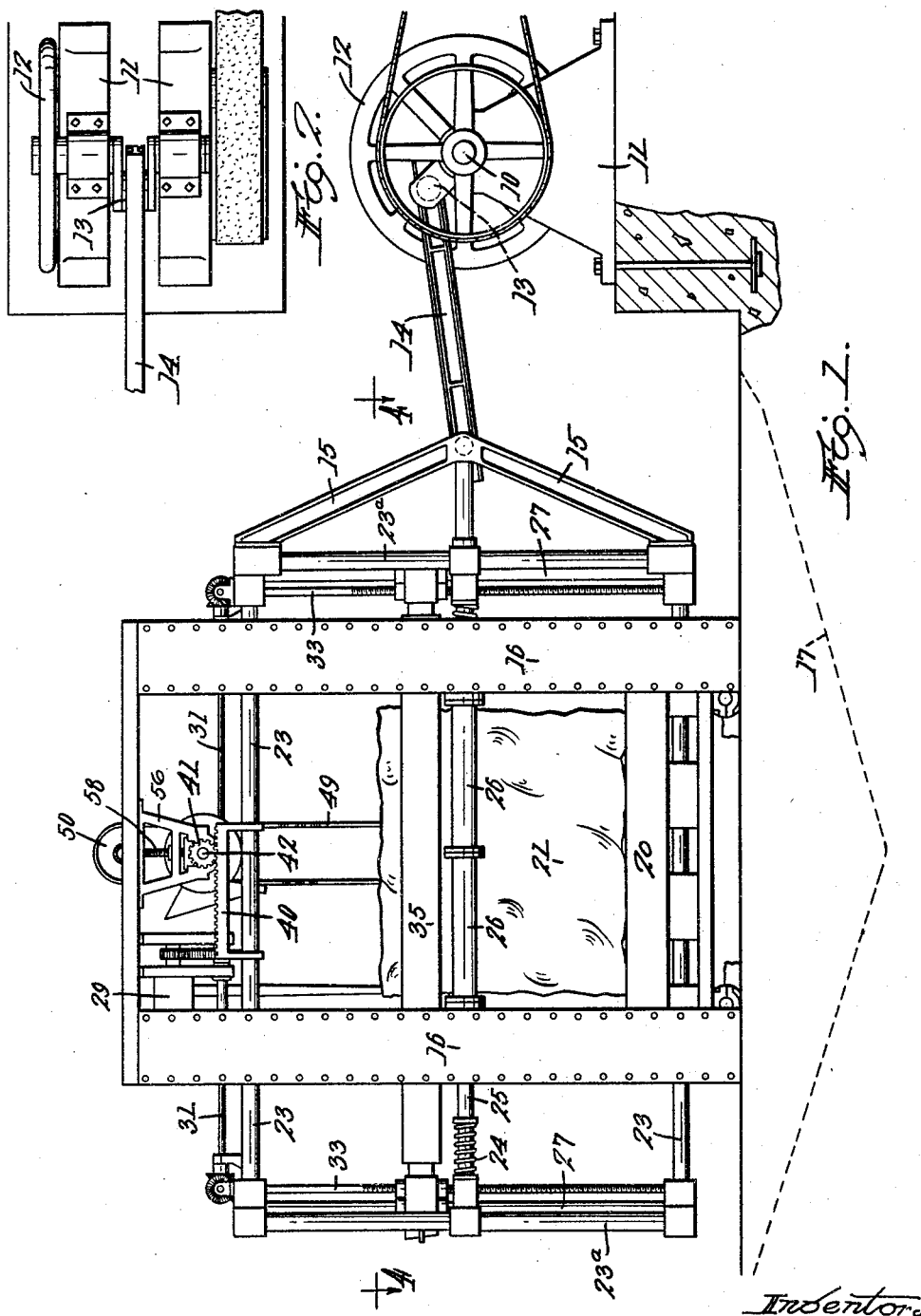

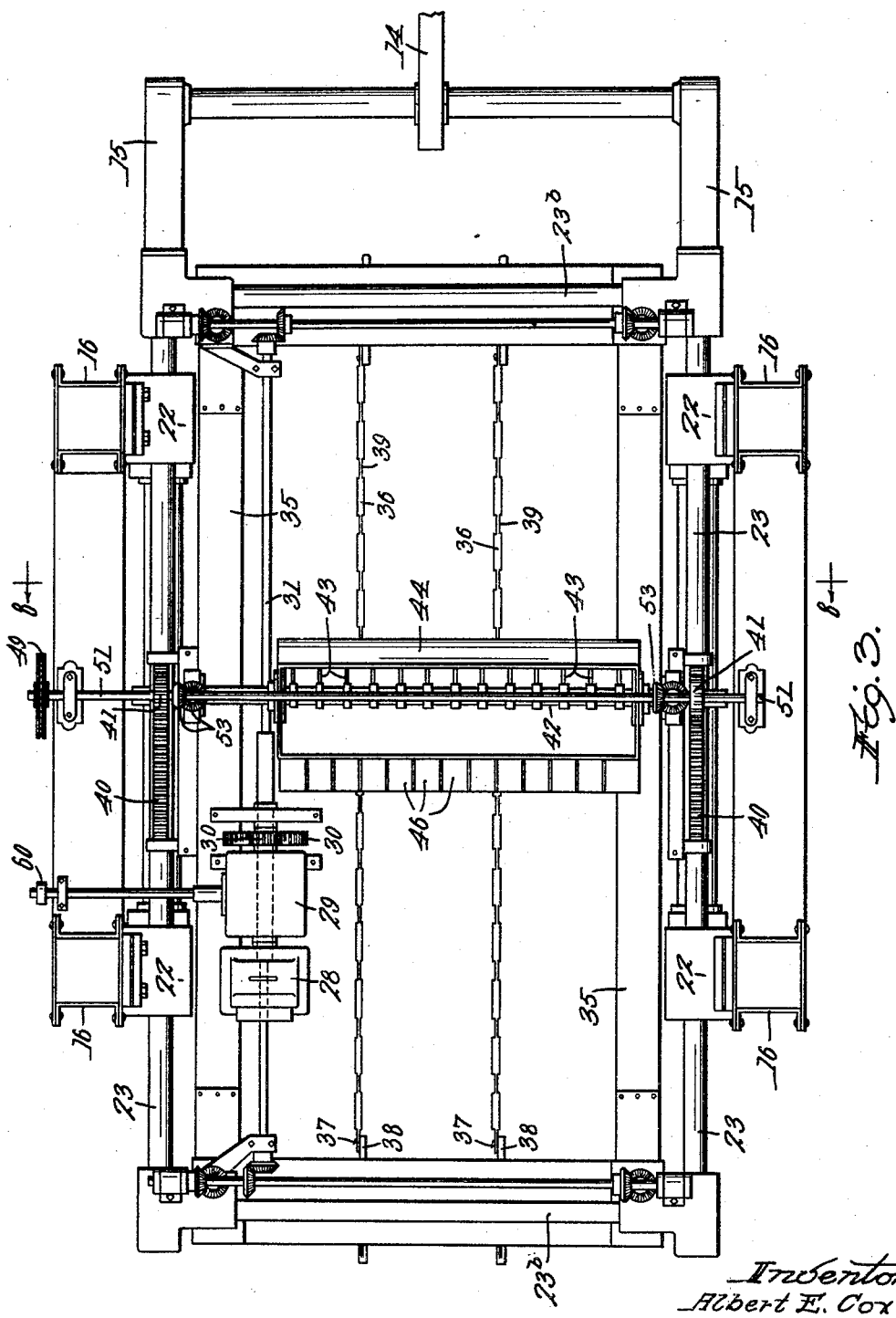

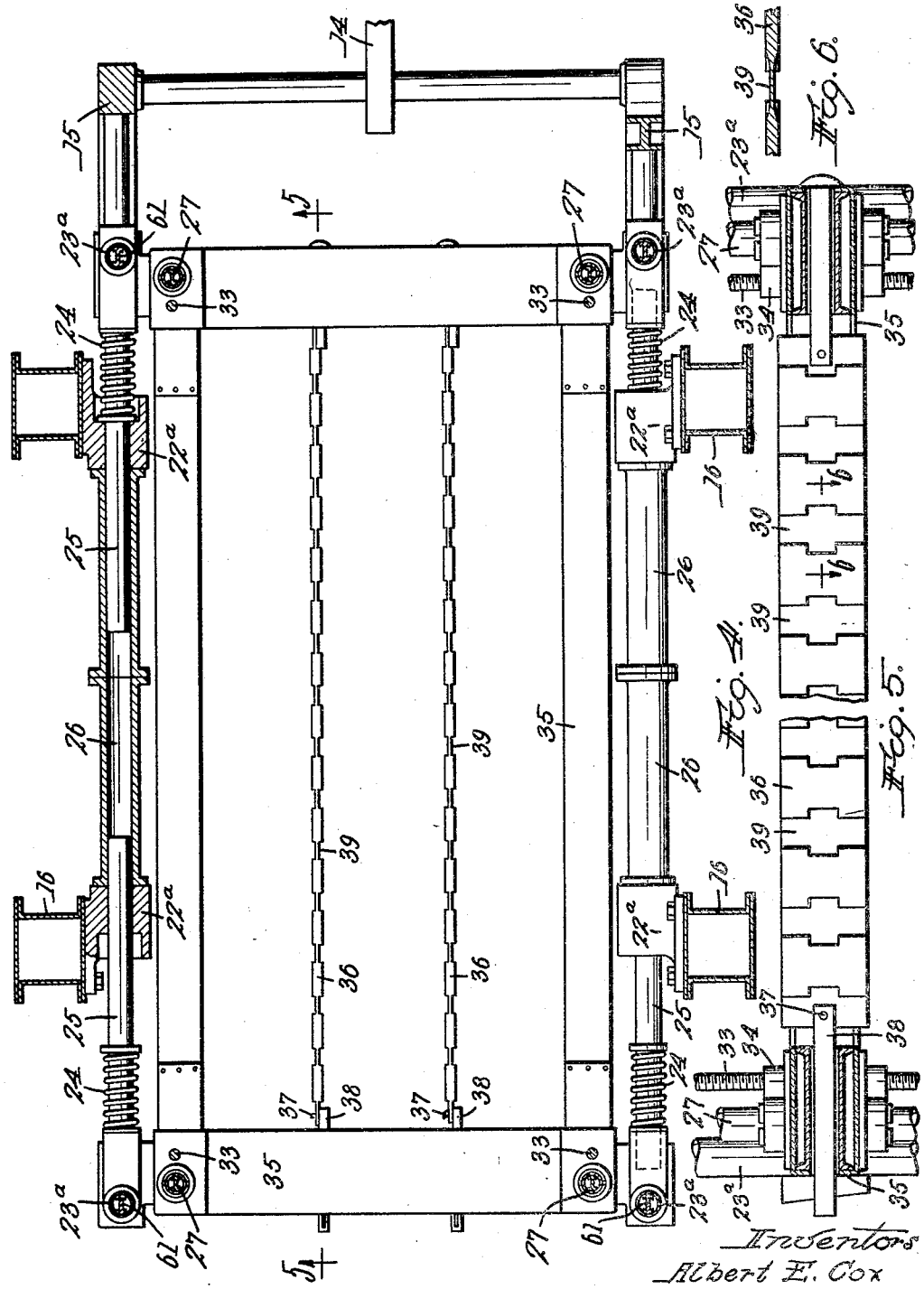

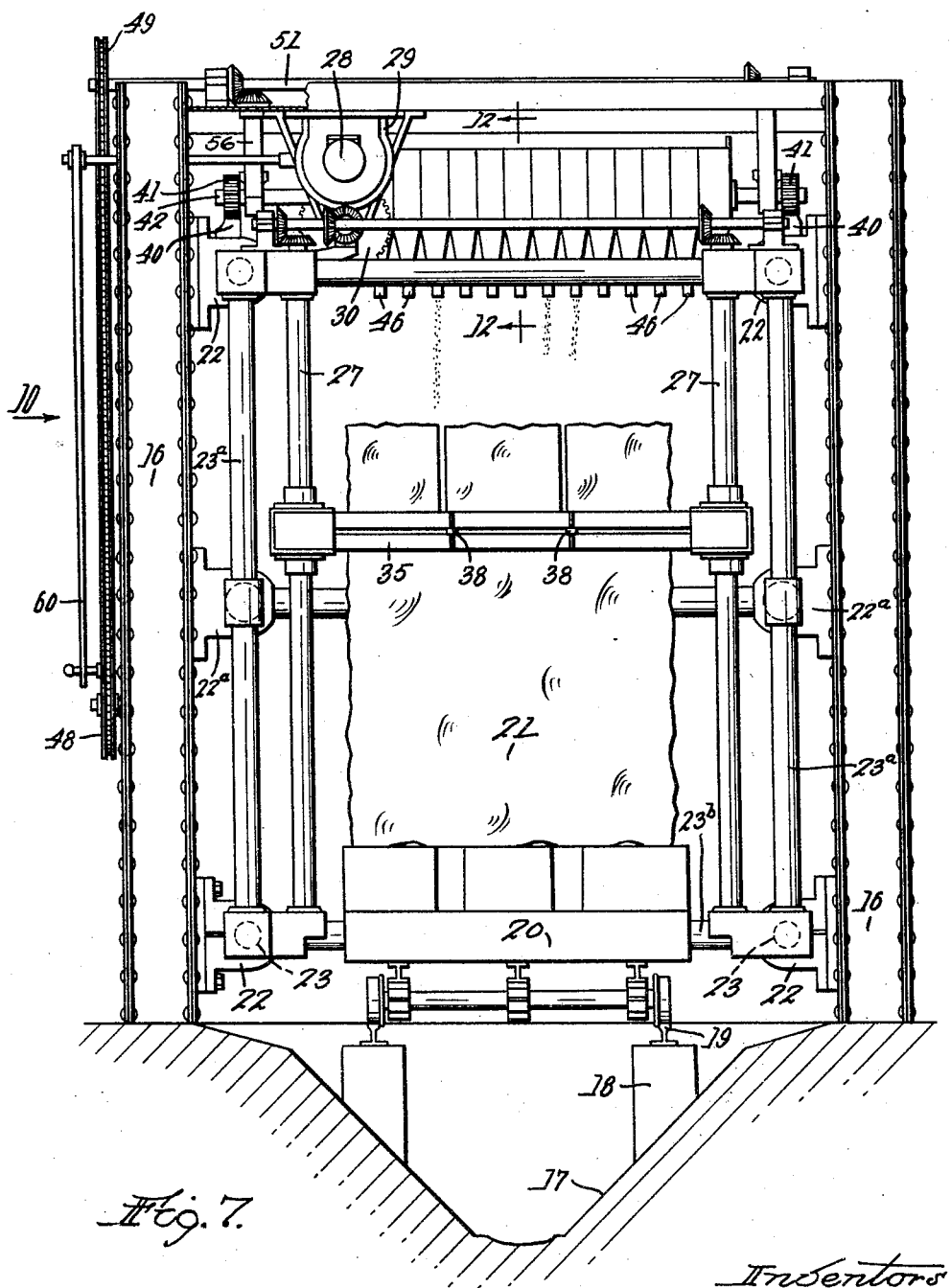

Inventors
Albert E. Cox
John B. Hall
By Attorneys
Southgate Fay & Hawley

Patented Dec. 6, 1932

1,890,109

UNITED STATES PATENT OFFICE

ALBERT E. COX AND JOHN B. HALL, OF HARDWICK, VERMONT

STONE SAWING MACHINE

Application filed November 19, 1931. Serial No. 576,148.

This invention relates to a machine for sawing stone, and the principal objects are to develop a comparatively high speed of reciprocation of the saw; to provide a sliding frame which carries the saw frame thereon in such a way as to be capable of vertical adjustment; to provide accurate means for raising and lowering the saw frame; to provide means for absorbing the shock of the reciprocating movement, and to provide improved means for feeding abrasive operated by the reciprocation of the frame.

Other objects and advantages of the invention will appear hereinafter.

Reference is to be had to the accompanying drawings, in which

Fig. 1 is a side elevation of a stone sawing machine constructed in accordance with this invention;

Fig. 2 is a plan of the actuating means therefor;

Fig. 3 is a plan of the stone sawing machine complete;

Fig. 4 is a sectional view on the horizontal line 4—4 of Fig. 1, showing the saw and other parts in plan;

Fig. 5 is a sectional view on the line 5—5 of Fig. 4, showing one of the saws in side elevation;

Fig. 6 is a sectional view on the line 6—6 of Fig. 5;

Fig. 7 is a front end elevation of the sawing machine;

Fig. 8 is a vertical sectional view on the line 8—8 of Fig. 3;

Fig. 9 is a sectional view on the vertical line 9—9 of Fig. 8;

Figure 10:
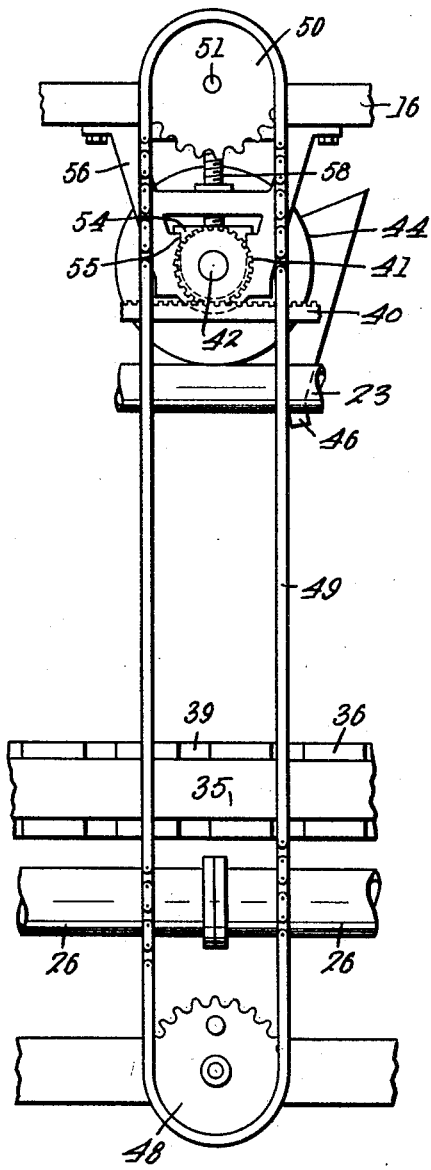
Fig. 10 is a side elevation of a portion of the device as indicated by the arrow 10 in Fig. 7 to show the means for operating the abrasive feeding device.
Figure 11:
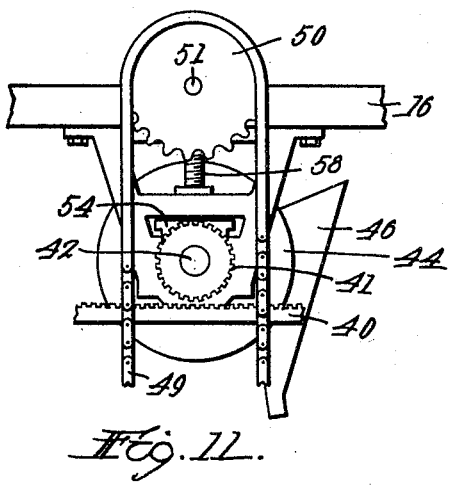
Fig. 11 is a view like the upper part of Fig. 10, but showing the parts adjusted so that the abrasive feed is not in operation.

In order to accomplish the above mentioned objects the machine is constructed in such form that it has a sliding frame movable horizontally and carries thereon a saw frame and means for attaching the saw blades thereto which saw frame is reciprocated by the movement of the sliding frame which supports it. The saw frame is raised and lowered by the operation of a slow speed motor and the feed of abrasive material or shot is controlled by the reciprocation of the frame so as to be passed down into the vicinity of the saw when the frame moves on its forward stroke only. The abrasive material feed can be disconnected by hand-operated means.

The power for running the machine is delivered to a shaft 10 carried on a fixed frame 11. This shaft is provided with a wheel 12 which constitutes both a hand wheel and a fly wheel and the shaft is also provided with a crank 13 which, by a connecting rod 14, is connected with the sliding frame 15. Obviously this frame 15 can be reciprocated by the rotation of the shaft 10. The frame 15 is made up of four horizontal tubes 23, vertical tubes 23$^a$ and horizontal connecting tubes 23$^b$. These tubes are reinforced by internal plates 61.

Now it will be observed that this machine comprises a pair of opposite upright frames 16 firmly fixed over a pit 17. In this pit are supports 18 for a pair of rails 19 and on these rails is adapted to run a truck 20 or the like which supports the block 21 of stone which is to be sawed. The truck is moved on these tracks 19 into position and held in position thereon during the sawing operation by any usual means. This way of supporting the stone is well known and does not constitute a feature of this invention.

On the frames 16 are eight bearings 22 for the horizontally sliding tubes 23, which constitute a part of the frame 15. These bearings, being fixedly mounted, serve to hold the sliding frame in horizontal position but allow it to reciprocate in the manner that has been described. The reciprocation of this frame is cushioned by shock-absorbing devices, such as springs 24 mounted on rods 25 carried by the frame 15. These rods are located at the center, one on each side. The springs engage bearings 22$^a$ and absorb the shock of the movement in each direction and assist in starting the frame back on the reverse movement. They act the same at each end. These rods 25 are secured at one end to the end of the sliding frame 15 and at the other they are located in hollow guides 26 carried by the bearings 22ª. The sliding frame 15 carries the saw frame 35 by means of reinforced tubes 27.

On the reciprocating frame is a motor 28 which, by a gear speed reducing and reversing unit 29, transmits power at a slow rate of speed through gears 30 to a square horizontal shaft 31 carried in suitable bearings on the top of the frame. At each end this shaft is provided with bevel gears and these bevel gears operate four vertical screws 33. The screws operate in nuts 34 on a saw frame 35. As the screws are rotated, these nuts are lowered, and the saw frame carried down with it to provide the feed.

This saw frame is shown as provided in the present instance with means for supporting two saws 36. This means constitutes a hook 37 in each case carried by a bar 38 and held in position on the frame 35. The construction is the same at each end and a single saw passes from one end frame to the other. These saws are milled out on opposite sides at a plurality of points, the milling extending from top to bottom on opposite sides. This provides a series of depressions 39 of less thickness than the main part of the saw. Thus a by-pass is provided for the abrasive and a direct passage for the abrasive to the cutting edge of the blade. This construction improves the surface of the stone as finished by the saw. The reason for this is that all the so-called shot marks on the cuts are removed by the provision of this by-pass for the shot.

Figure 12:
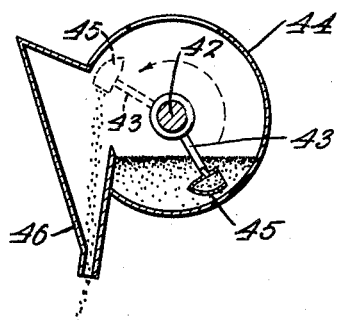
Fig. 12 is a sectional view on the line 12—12 of Fig. 7 showing the shot feed.

On the reciprocating frame 15 are carried two racks 40. These are adapted to mesh with a gear 41 on a shaft 42 supported from the fixed frame 16. Thus this shaft is oscillated back and forth as the frame reciprocates. The shaft is provided with an arm 43 inside a hopper 44 in which shot or other abrasive material is provided. On the end of the arm 43 is a cup 45 which is so proportioned as to pick up a sufficient number of shot. Obviously this cup swings around from the full line position in Fig. 12 to the dotted line position where it will discharge the shot through a hopper 46 directly over the saw. Then on the back movement of the frame the cup moves back to the full line position, or beyond it, ready for the next operation. It will be understood that there are a large number of these hoppers and a cup 45 of course in each one. This furnishes a simple and convenient way for feeding the right amount of shot at each reciprocation and avoid the feeding of any shot on the backward stroke.

In order to lift the gear 41 out of engagement with the rack 40, so that the machine can be operated for experimental purposes or otherwise without feeding shot, the following mechanism is provided. Within reach of the operator is a hand wheel 48 having gear teeth on it for operating a chain 49 which in turn operates a gear 50. This gear is provided with a shaft 51. On the shaft 51 are bevel gears 53 meshing with bevel gears on the two movable screws 58. These screws enter threads in blocks 54 which carry the shaft 42. These blocks are vertically slidable in guides 55 in brackets 56 which support this mechanism from the top of the frame 16.

It will be seen therefore that by turning the hand wheel 48, the screws 58, one of which is mounted on each side of the machine, can be brought by hand into or out of engagement with the two racks 40.

It will be seen that a comparatively high speed reciprocation can be secured by this mechanism because shock is absorbed and the parts are firmly mounted. The machine involves a sliding frame, which is usual, but this is built very strongly and rigidly and carries the saw frame to which the saw blades are attached. This saw frame can be raised and lowered by the operation of the motor which is controlled by a handle 60 which extends down within reach of the operator. Simple means is provided for absorbing the shock of the reciprocating means, thus increasing the durability of the machine and simple means is provided for feeding the abrasive by the reciprocation of the frame.

Although we have illustrated and described only one form of the invention we are aware of the fact that modifications can be made therein by any person skilled in the art without departing from the scope of the invention as expressed in the claims. Therefore we do not wish to be limited in this respect but what we do claim is:

1. In a stone sawing machine, the combination of a rigid stationary frame, a horizontal reciprocable frame carried and guided by the stationary frame, a pair of bearings carried by the stationary frame, rods carried by the reciprocating frame and projecting into said bearings, and springs on the rods for cushioning the blow when the reciprocating frame reaches the end of its stroke and helping to start the reciprocating frame back on the opposite stroke.

2. In a stone sawing machine, the combination of a reciprocable frame, a saw frame carried thereby, a series of hoppers supported by the stationary frame over the saw frame, a rack on the reciprocating frame, a pinion mounted to mesh with the rack, and means operated by the pinion for introducing an abrasive into the several hoppers as the pinion oscillates.

3. In a stone sawing machine, the combination of a reciprocating frame, a saw frame carried thereby, a rack carried by the reciprocating frame, a pinion in position to mesh with the rack, whereby the pinion will be oscillated as the reciprocating frame goes back and forth, a shot tank, and a cup carried by the shaft of the pinion to lift the shot out of the tank and discharge it at one side thereof as the pinion turns in one direction.

4. In a stone sawing machine, the combination of a reciprocating frame, a shot tank adjacent thereto, a shaft in the tank having a cup thereon, means carried by the reciprocating frame for oscillating said shaft as the frame reciprocates, and hand operated means for moving the shaft out of operative relationship to the reciprocating frame to permit operation of the machine without feeding the shot.

5. In a stone sawing machine, the combination of a reciprocating frame, a rack carried thereby and movable therewith, a shot tank having a series of hoppers depending therefrom, a shaft in the shot tank having cups thereon in position to take the shot out of the tank and swing it around into the hoppers when the shaft turns in one direction, a pinion on said shaft for engaging said rack, and hand operated means for raising the shaft and pinion to bring the pinion out of mesh with the rack for the purpose described.

In testimony whereof we have hereunto affixed our signatures.

ALBERT E. COX.
JOHN B. HALL.